April 8, 1930.  R. E. MIESSE  1,753,298
PURIFYING RARE GASES
Filed Jan. 3, 1927
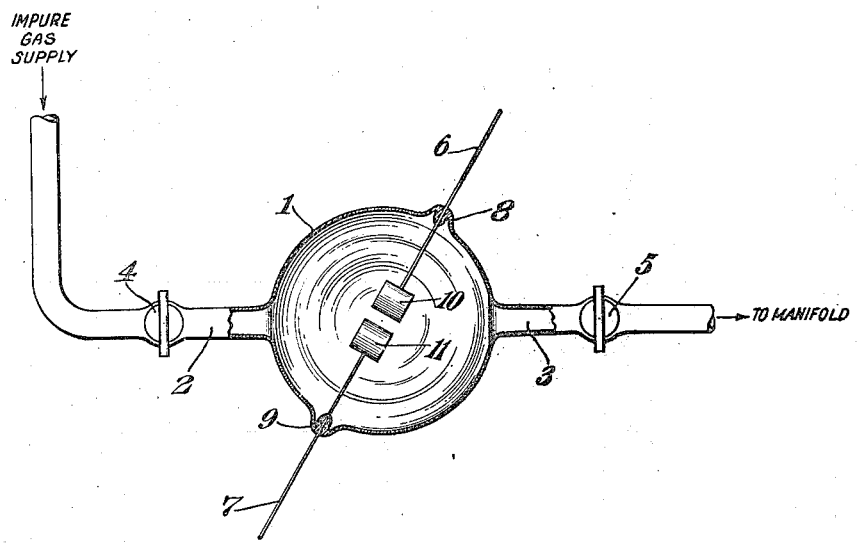
Inventor
Richard E. Miesse
By his Attorneys
Ward Crosby + Smith Patented Apr. 8, 1930

1,753,298

UNITED STATES PATENT OFFICE

RICHARD E. MIESSE, OF JERSEY CITY, NEW JERSEY, ASSIGNOR TO NEW PROCESS METALS CORPORATION, OF NEWARK, NEW JERSEY, A CORPORATION OF NEW JERSEY

PURIFYING RARE GASES

Application filed January 3, 1927. Serial No. 158,580.

My invention relates to improvements in purifying rare gases such as neon, argon, krypton, niton, helium and xenon. The main object of the invention is to provide an apparatus for purifying such gases which is more efficient and satisfactory than those heretofore used. Further and more specific objects, features and advantages will more clearly appear from the detail description below taken in connection with the accompanying drawing which forms a part of this specification.

The figure of the drawing illustrates diagrammatically a preferred form of apparatus.

I have discovered that if such rare gases containing oxygen, nitrogen, hydrogen and other impurities, or one or more of them, as impurities, be placed in a suitable container in which are two electrodes, one or both of the electrodes being composed of an alloy of cerium, lanthanum and small amounts of other rare earth metals, said alloy being known as misch metal, and an electric discharge be caused to take place in the gas between said electrodes or from one to the other, that a very satisfactory purification of the rare gas or gases may be obtained, even with the gases in the container under atmospheric pressure or thereabouts. For this purpose I prefer to use an arrangement like that shown in the drawing in which 1 represents a suitable glass bulb or container having integrally formed therewith an inlet tube at 2 and an outlet tube at 3. The inlet tube is provided with a suitable valve at 4 and the outlet tube with a suitable valve at 5. The inlet tube 2 may lead to a suitable tank or supply of the gas to be purified, while the outlet tube 3 may lead to a manifold for conducting the gases to devices in which the purified gases are to be used. 6 and 7 represent tungsten lead wires or rods passing into the glass tube 1 and sealed therein at 8 and 9 respectively. In the tube 1 and electrically connected to and supported by the ends of the rods 6 and 7 are electrodes 10 and 11 respectively. One or both of these electrodes are composed of misch metal or a material containing a cerium alloy. I prefer an alloy containing mainly cerium and some lanthanum with small quantities of other rare earth metals and preferably also a small amount of iron. The alloy may also contain very small quantities of nitrides, oxides or other compounds of one or more of the metals. I preferably use electrodes about 3/4 inch in diameter and about 3/4 inch long placed quite close together as shown in the drawing.

I find that when an electric discharge is caused to take place between such electrodes in the gas to be purified, the gas may be effectively purified even though a considerable quantity of gas be included in the tube as would be the case if the gas therein be at atmospheric pressure or thereabouts. The electric discharge seems to dissipate and vaporize some of the misch metal or cerium alloy and the vapors so produced I believe combine with certain of the gaseous impurities, such as oxygen, forming metallic oxides or compounds which fall to the bottom of the tube and are thus effectively removed from the rare gas or gases being purified. As to less active gaseous impurities, the electric discharge seems to send off fine particles of misch metal or cerium alloy or components thereof, which particles take up to a substantial extent these gaseous impurities and deposit them on the walls of the tube, i. e., they are plated out on the walls of the tube, leaving the inert or rare gases in a very pure state. Some of the neon or other rare gases may be also similarly removed but the impurities are removed so much faster that the rare gases may be effectively purified before any substantial amount thereof is so lost.

In carrying out the process of purifying the gases the valve 4 is closed and valve 5 opened, the tube 1 exhausted of air, etc., as far as possible as by connecting a vacuum pump to the tube or pipe 3. Then the valve 5 is closed and valve 4 opened to fill the tube 1 with the gases to be purified. Then the valve 4 is closed and a suitable electric discharge is caused to take place between the electrodes and the purification proceeded with as above described. The purification is preferably carried on until the impurities have been removed to such an extent that they will be practically invisible in the spectrum of the purified gas. The purified gas may then be conducted to other tubes or devices in which it is to be used, such for example as rectifying tubes.

While I have described my improvements in great detail and with respect to a preferred form thereof, I do not desire to be limited to such form or details since many changes and modifications may be made and the invention embodied in widely different forms without departing from the spirit and scope thereof in its broader aspects. Hence I desire to cover all modifications and forms coming within the language or scope of any one or more of the appended claims.

What I claim as new and desire to secure by Letters Patent, is:

1. Apparatus for purifying rare gases having in combination a container holding the gases during purification, two misch metal electrodes therein and means causing an electric discharge to take place in the gases in the container between said electrodes.

2. Apparatus for purifying rare gases having in combination a container holding the gases during purification thereof, two electrodes in said container, one electrode being of misch metal, and means causing an electric discharge to take place in the gases in the container from said misch metal electrode.

3. Apparatus for purifying rare gases having in combination a container holding the gases during purification thereof, two electrodes containing cerium alloy in said container and means causing an electric discharge to take place in the gases in the container between said electrodes.

4. Apparatus for purifying rare gases having in combination a container holding the gases during purification thereof, two electrodes therein, one of said electrodes containing cerium alloy and means causing an electric discharge to take place in the gases in the container between said electrodes.

5. Apparatus for purifying rare gases having in combination a glass container holding gases during purification thereof, a valved inlet through which the gases may be introduced into the container, a valved outlet through which the purified gases may be withdrawn from the container, two electrodes in said container, one electrode being of misch metal, and means causing an electric discharge to take place in the gases in the container from said misch metal electrode.

6. Apparatus for purifying rare gases having in combination a glass container holding gases during purification thereof, a valved inlet through which the gases may be introduced into the container, a valved outlet through which the purified gases may be withdrawn from the container, two electrodes in said container, one electrode being of cerium alloy, and means causing an electric discharge to take place in the gases in the container from said electrode.

In testimony whereof I have signed my name to this specification.

RICHARD E. MIESSE.